(12) United States Patent
Prasad et al.

(10) Patent No.: US 8,576,959 B2
(45) Date of Patent: Nov. 5, 2013

(54) RECEIVER WITH PREFILTERING FOR DISCRETE FOURIER TRANSFORM-SPREAD-ORTHOGONAL FREQUENCY DIVISION MULTIPLEXING (DFT-S-OFDM) BASED SYSTEMS

(75) Inventors: Narayan Prasad, Plainsboro, NJ (US); Xiaodong Wang, New York, NY (US); Shuangquan Wang, Kearny, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1148 days.

(21) Appl. No.: 12/425,080

(22) Filed: Apr. 16, 2009

(65) Prior Publication Data

US 2009/0262872 A1    Oct. 22, 2009

Related U.S. Application Data

(60) Provisional application No. 61/045,298, filed on Apr. 16, 2008.

(51) Int. Cl.
*H04L 27/06*    (2006.01)
(52) U.S. Cl.
USPC ........... 375/341; 375/262; 375/267; 375/340; 375/346; 375/347
(58) Field of Classification Search
USPC ............ 375/267, 340, 341, 347, 262, 346; 370/340
See application file for complete search history.

(56) References Cited

U.S. PATENT DOCUMENTS

| | | | | |
|---|---|---|---|---|
| 7,016,436 B1* | 3/2006 | Molnar | | 375/346 |
| 7,133,467 B2* | 11/2006 | Nishio et al. | | 375/316 |
| 7,359,466 B2* | 4/2008 | Huang et al. | | 375/349 |
| 7,593,489 B2* | 9/2009 | Koshy et al. | | 375/340 |
| 7,593,492 B1* | 9/2009 | Lande | | 375/346 |
| 7,787,553 B2* | 8/2010 | Prasad et al. | | 375/267 |
| 2002/0196871 A1* | 12/2002 | Nishio et al. | | 375/322 |
| 2006/0291599 A1* | 12/2006 | Strodtbeck et al. | | 375/347 |
| 2007/0004366 A1* | 1/2007 | Prasad et al. | | 455/272 |
| 2007/0116143 A1* | 5/2007 | Bjerke et al. | | 375/262 |
| 2009/0304122 A1* | 12/2009 | Fatemi-Ghomi et al. | | 375/341 |

* cited by examiner

*Primary Examiner* — Sophia Vlahos
(74) *Attorney, Agent, or Firm* — Joseph Kolodka

(57) ABSTRACT

A receiver for discrete Fourier transform-spread-orthogonal frequency division multiplexing (DFT-S-OFDM) based systems, including a prefilter for received signal codeword(s); and a log-likelihood ratio LLR module responsive to the prefilter; wherein the prefilter includes a pairing and whitening module that based on channel estimates and data rate enables the LLR module to perform either a Serial-In-Serial-Out (SISO) based log likelihood ratio processing of an output from the paring and whitening module or a two-symbol max-log soft output demodulator (MLSD) based log likelihood ratio processing of an output from the pairing and whitening module.

14 Claims, 2 Drawing Sheets

RECEIVER WITH PREFILTERING FOR DISCRETE FOURIER TRANSFORM-SPREAD-ORTHOGONAL FREQUENCY DIVISION MULTIPLEXING (DFT-S-OFDM) BASED SYSTEMS

This application claims the benefit of U.S. Provisional Application No. 61/045,298, entitled "Efficient receiver Algorithms for DFT-Spread Spectrum OFDM Systems", filed on Apr. 16, 2008, the contents of which is incorporated by reference herein.

BACKGROUND OF THE INVENTION

The present invention relates generally to wireless communications, and more particularly, to a receiver for DFT-Spread MIMO-OFDM systems.

Referring to the diagram in FIG. 1, each mobile (or source) transmits its signal using the DFT-S-OFDM technique. The destination or base station receives signals from several mobiles possibly overlapping in time and frequency and has to decode the signal of each mobile.

Discrete Fourier Transform-spread-Orthogonal Frequency Division Multiple Access (DFT-spread-OFDMA or DFT-S-OFDMA) has emerged as the preferred uplink air interface for the next generation cellular systems such as the 3GPP LTE. The main advantage of this multiple access technique is that it results in considerably lower envelope fluctuations in the signal waveform transmitted by each user and consequently lower peak-to-average-power ratio (PAPR) compared to the classical OFDMA technique. A lower PAPR in turn implies a smaller power back off at the user terminal and hence an improved coverage for the cellular system. Another key technology that will be employed in the upcoming cellular systems is the utilization of antenna arrays at the base station (a.k.a Node-B) and possibly at the user equipment (UE). Multiple antennas when used in point-to-point or multipoint-to-point systems have been shown in theory to result insubstantial capacity improvements, provided that the environment is sufficiently rich in multipath components. However, in practice the capacity improvement obtained by using multiple antennas at the UEs in the uplink can be much smaller due to the fact that multiple antennas will have to be accommodated in the limited space available at the UE, which will result in correlated channel responses that are not conducive to high rate communications. Moreover, installing multiple power amplifiers in each UE is currently deemed impractical based on cost considerations by many vendors.

A promising scheme, also adopted in 3GPP LTE, which circumvents these two issues is the space-division multiple-access (SDMA) scheme which is sometimes referred to as the virtual multiple-input-multiple-output (MIMO) scheme. In SDMA multiple single-antenna users are scheduled over the same frequency and time resource block in order to boost the system throughput. Since different users are geographically separated, their channel responses seen at the base-station antenna array will be independent and hence capable of supporting high rate communications. Henceforth, the DFT-S-OFDM based uplink employing SDMA will be referred to as the DFT-S-OFDM-SDMA uplink.

In DFT-S-OFDM systems, which encompass both DFT-S-OFDMA and DFT-S-OFDM-SDMA, as a consequence of the DFT spreading operation at the transmitter, the signal arrives at the base-station with substantial intersymbol interference and the received sufficient statistics can be modeled as the channel output of a large MIMO system. The conventional receiver technique involves tone-by-tone single-tap equalization followed by an inverse DFT operation. While such a simple receiver suffices for the single-user case in the low-rate regime when there is enough receive diversity and where the available frequency diversity can be garnered by the underlying outer code, it results in degraded performance at higher rates as well as with SDMA.

Unfortunately, unlike classical OFDMA, the large dimension of the equivalent MIMO model in DFT-S-OFDMA does not allow us to leverage the sphere decoder which has an exponential complexity in the problem dimension. Furthermore, the stringent complexity constraints in practical systems also rule out the near-optimal MIMO receivers developed for the narrowband channels. Other promising equalizers for the DFT-S-OFDM systems are the decision feedback equalizers (DFE), in particular the hybrid DFE, where the feedforward filter is realized in the frequency domain and the feedback filter is realized in the time domain, and the iterative block DFE with soft decision feedback that has been proposed by others, where even the cancelation is performed in the frequency domain. However, even the DFE whose iterative process does not include decoding the outer code is substantially more complex and has higher latency especially in the SDMA case, than the conventional receiver.

Accordingly, there is a need for a receiver at the destination or base station that can receive and decode multiple wireless signals overlapping in time and frequency in a manner that overcomes the limitations of the conventional receiver techniques discussed above.

SUMMARY OF THE INVENTION

In accordance with the invention, there is provided a receiver for discrete fourier transform-spread-orthogonal frequency division multiplexing (DFT-S-OFDM) based systems, including a prefilter for received signal codeword(s); and a log-likelihood ratio LLR module responsive to the prefilter; wherein the prefilter includes a pairing and whitening module that based on channel estimates and data rate enables the LLR module to perform either a Serial-In-Serial-Out (SISO) based log likelihood ratio processing of an output from the pairing and whitening module or a two-symbol max-log soft demodulator (MLSD) based log likelihood ratio processing of an output from the pairing and whitening module. In a preferred embodiment, the prefilter further includes a per-tone equalizer for the received signal codeword(s) and an inverse discrete Fourier transform IDFT module responsive to the equalizer, with the pairing and whitening module being responsive to the IDFT.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to a more powerful receiver for DFT-spread OFDM systems that includes an efficient linear pre-filter and a two-symbol max-log soft-output demodulator. The proposed inventive receiver can be applied to both single user per resource block (RB) (DFT-S-OFDMA) and multiple users per RB (DFT-S-OFDM-SDMA) systems and it offers significant performance gains over the conventional method, especially in the high-rate regime, with little attendant increase in computational complexity.

Figure 1:
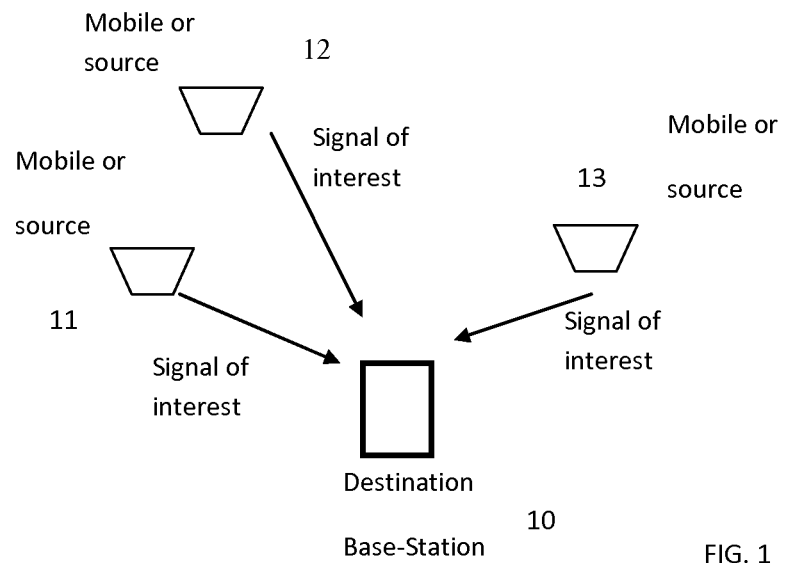
FIG. 1 is a diagram of an exemplary wireless network, with multiple mobile signal sources 11-13 transmitting to a destination base-station 10, in which the inventive receiver can be employed.
Figure 2:
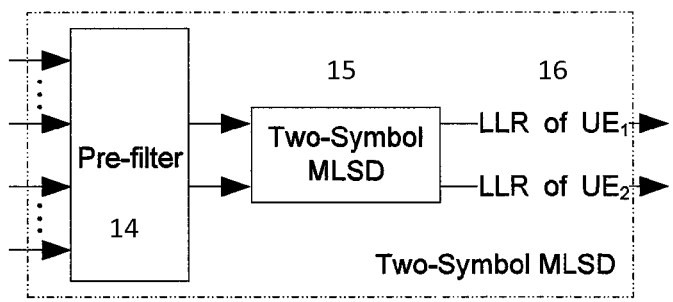
FIG. 2 is diagram of a two-symbol MLSD DFT-S-OFDM receiver in accordance with the invention.

Referring now to FIG. 2 there is shown an exemplary two-symbol MLSD DFT-S-OFDM-SDMA Receiver employing the inventive pre-filtering processing. Transmitted data symbols are received at the pre-filter processor 14 and then sent to the two-symbol max-log soft-output demodulator (MLSD) 15 which outputs log Likelihood Ratios (LLR) corresponding to the user equipments 16. The prefilter 14 structure is depicted in FIG. 3 demodulating a single user signal codeword and demodulating multiple signal codewords in FIG. 4.

Figure 3:
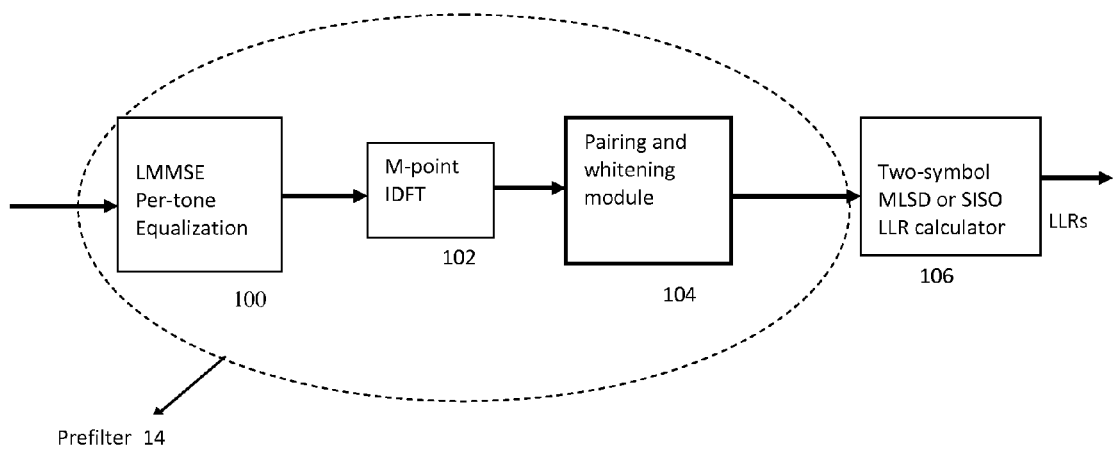
FIG. 3 is a diagram of the prefilter, shown in the receiver diagram of FIG. 2, demodulating a single signal codeword, in accordance with the invention.
Figure 4:
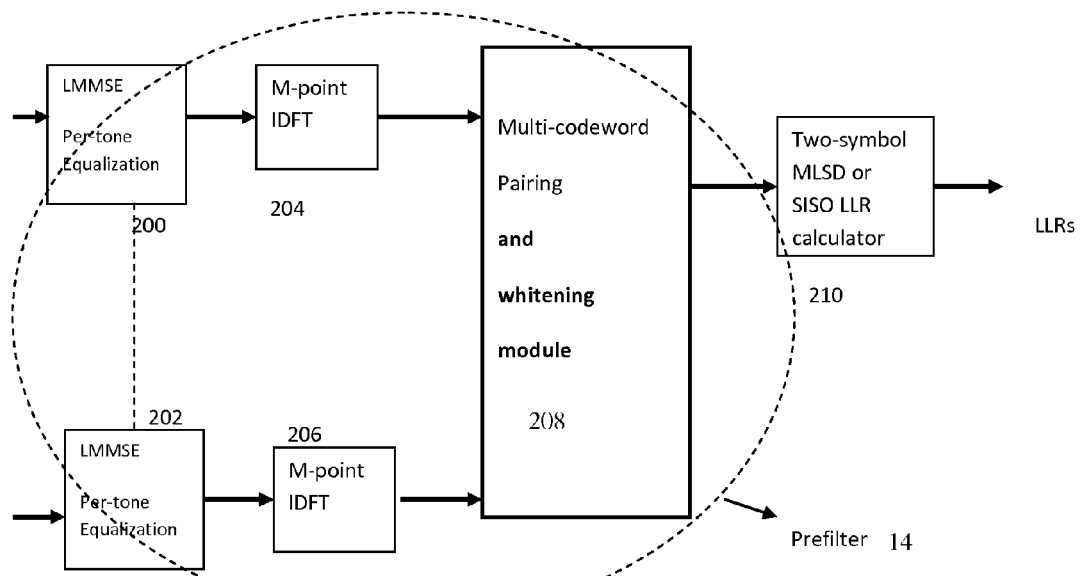
FIG. 4 is a diagram of the prefilter, shown in the receiver diagram of FIG. 2, demodulating multiple signal codewords, in accordance with the invention.

For understanding of the invention and the block diagrams of FIG. 3 and FIG. 4, we present the underlying signal analysis to arrive at the inventive signal receiving. Parenthetical numbers referencing particular signal processes are referred to again when discussing corresponding receiver processes.

We derive a simple receiver for the DFT-S-OFDM-SDMA uplink. For convenience we consider SDMA with two UEs but the receiver can be extended to more than two UEs as well as the DFT-S-OFDMA uplink with only one UE.

Receivers for DFT-S-OFDM Based Systems 1-1.4

1 DFT-S-OFDM-SDMA Receivers

We assume that there are two UEs and for the m-th subcarrier (tone) the $n_R \times 1$ channel response vector of the k-th UE is $h_m^{(k)} \in \mathbb{C}^{n_R}$ and the DFT-spread symbol is $x_m^{(k)}$, k=1, 2. The received signal vector on the m-th tone is given by $$y_m = H_m x_m + n_m, \quad (1)$$

where $$H_m \triangleq [h_m^{(1)}, h_m^{(2)}] \text{ and } x_m \triangleq [x_m^{(1)}, x_m^{(2)}]^T.$$

The noise vector $n_m$ is spatially uncorrelated and satisfies $E[n_m n_m^\dagger]=I$. We define $s^{(k)}=[s_1^{(k)}, s_2^{(k)}, \ldots, s_M^{(k)}]^T$ for k=1, 2, where $\{s_m^{(k)}\}$ are QAM symbols normalized to have unit average energy and let $x^{(k)}=[x_1^{(k)}, x_2^{(k)}, \ldots, x_M^{(k)}]^T = F s^{(k)}$, where F is the M×M DFT matrix. We can now write the received signal over all the M tones in the matrix form as $$y = [H^{(1)}, H^{(2)}]\begin{bmatrix} x^{(1)} \\ x^{(2)} \end{bmatrix} + n = [H^{(1)}F, H^{(2)}F]\begin{bmatrix} s^{(1)} \\ s^{(2)} \end{bmatrix} + n, \quad (2)$$

where $$y \triangleq [y_1^T, y_2^T, \ldots, y_M^T]^T \in \mathbb{C}^{n_R M},$$

and $H^{(k)} \triangleq \text{diag}(h_1^{(k)}, \ldots h_M^{(k)}) \in \mathbb{C}^{n_R M \times M}.$ 1.1 Conventional Linear MMSE (LMMSE) Receiver The linear MMSE estimate of $x_m^{(k)}$, k=1, 2, based on $y_m$ in (1) is given by[1]

$$\begin{bmatrix} \hat{x}_m^{(1)} \\ \hat{x}_m^{(2)} \end{bmatrix} = H_m^\dagger (I + H_m H_m^\dagger)^{-1} y_m = (I + H_m^\dagger H_m)^{-1} H_m^\dagger y_m, \quad (3)$$

$$m = 1, \ldots, M.$$

Defining $\hat{x}^{(k)} = [\hat{x}_1^{(k)}, \ldots, \hat{x}_M^{(k)}]^T$ and applying the inverse DFT on $\hat{x}^{(k)}$, we obtain $$\hat{s}^{(k)} \triangleq F^\dagger \hat{x}^{(k)} \quad (4)$$

$$\hat{s}_i^{(k)} = \alpha^{(k)} s_i^{(k)} + v_i^{(k)}, i = 1, \ldots, M, \quad (5)$$

$$\text{with } \alpha^{(k)} = \frac{1}{M}\sum_{m=1}^{M} d_m^{(k)} \quad (6)$$

and $d_m^{(k)} = h_m^{(k)\dagger}(H_m H_m^\dagger + I)^{-1} h_m^{(k)}$

Then, (4) can be simplified as $$\hat{s}_i^{(k)} = \alpha^{(k)} s_i^{(k)} + v_i^{(k)}, i = 1, \ldots, M, \quad (5)$$

with $$\alpha^{(k)} = \frac{1}{M}\sum_{m=1}^{M} d_m^{(k)} \text{ and } d_m^{(k)} = h_m^{(k)\dagger}(H_m H_m^\dagger + I)^{-1} h_m^{(k)} \quad (6)$$

where $v_i^{(k)}$ contains the residual interference and noise, with variance $$\mathbb{E}[|v_i^{(k)}|^2] = \alpha^{(k)}(1-\alpha^{(k)}). \quad (7)$$

1.2 New SDMA Receiver

All operations up-to equation (4) are same as the conventional LMMSE receiver. We thus obtain $$\hat{s}^{(1)} \triangleq F^\dagger \hat{x}^{(1)} \text{ and } \hat{s}^{(2)} \triangleq F^\dagger \hat{x}^{(2)}.$$

Let us expand $\hat{s}^{(1)} = [\hat{s}_1^{(1)}, \ldots, \hat{s}_M^{(1)}]^T$ and $\hat{s}^{(2)} = [\hat{s}_1^{(2)}, \ldots, \hat{s}_M^{(2)}]^T$. Next, form the pairs $\hat{s}_m = [\hat{s}_m^{(1)}, \hat{s}_m^{(2)}]^T$ for $1 \leq m \leq M$.

We will demodulate each one of the M pairs using a two-symbol max-log demodulator. Before that we need to do a "noise-whitening" operation on each of the M pairs. To do this, we determine $$C = \frac{1}{M}\sum_{m=1}^{M}(I + H_m^\dagger H_m)^{-1}.$$

Note that the terms $(I + H_m^\dagger H_m)^{-1}$, $1 \leq m \leq M$ are computed in the LMMSE filter so they need not be re-computed. Next, we compute the 2×2 matrix $Q \in \mathbb{C}^{2 \times 2}$ using the Cholesky decomposition $$QQ^\dagger = (I-C)C \quad (8)$$

and then determine $$z_m \triangleq Q^{-1} \hat{s}_m,$$

$1 \leq m \leq M$. $z_m \in \mathbb{C}^{2 \times 1}$ permits the expansion $$z_m = \underbrace{Q^{-1}(I-C)}_{T} s_m + \check{n}_m, \quad 1 \leq m \leq M, \qquad (9)$$

with $T \in \mathbb{C}^{2 \times 2}$, $s_m = [s_m^{(1)}, s_m^{(2)}]^T$ and $\mathbb{E}[\check{n}_m \check{n}_m^\dagger] = I$. The two symbols in $s_m$ can now be jointly demodulated using the two-symbol max-log demodulator on $z_m$ for $1 \leq m \leq M$. $(.)^\dagger$ denotes the conjugate transpose operator.

1.3 New SDMA Receiver with Improved Pairing

All operations up-to equation (4) are same as the conventional LMMSE receiver. We thus obtain $$\hat{s}^{(1)} \triangleq F^\dagger \hat{x}^{(1)} \text{ and } \hat{s}^{(2)} \triangleq F^\dagger \hat{x}^{(2)}.$$

Let us expand $\hat{s}^{(1)} = [\hat{s}_1^{(1)}, \ldots, \hat{s}_M^{(1)}]^T$ and $\hat{s}^{(2)} = [\hat{s}_1^{(2)}, \ldots, \hat{s}_M^{(2)}]^T$. Suppose we form the pairs $\hat{s}_{m,q} = [\hat{s}_m^{(1)}, \hat{s}_{[m+q]}^{(2)}]^T$ for $1 \leq m \leq M$ and any given q: $0 \leq q \leq M-1$ and where $[m+q] = (m+q-1) \mod(M) + 1$. Then we determine the matrix X(q) such that $$I - X(q) = \qquad (10)$$

$$\frac{1}{M} \begin{bmatrix} \sum_{k=1}^{M} h_k^{(1)\dagger} R_k^{-1} h_k^{(1)} & \sum_{k=1}^{M} h_k^{(1)\dagger} R_k^{-1} h_k^{(2)} \exp(-j2\pi q(k-1)/M) \\ \sum_{k=1}^{M} h_k^{(2)\dagger} R_k^{-1} h_k^{(1)} \exp(j2\pi q(k-1)/M) & \sum_{k=1}^{M} h_k^{(2)\dagger} R_k^{-1} h_k^{(2)} \end{bmatrix},$$

where $R_k = I + H_k H_k^\dagger$. Please note that the pairing used in Section 1.2 always uses q=0. Next, we compute the 2×2 matrix $Q(q) \in \mathbb{C}^{2 \times 2}$ using the Cholesky decomposition $$Q(q)Q(q)^\dagger = (I - X(q))X(q) \qquad (11)$$

and then determine $$z_{m,q} \triangleq Q(q)^{-1} \hat{s}_{m,q},$$

$1 \leq m \leq M$. $z_{m,q} \in \mathbb{C}^{2 \times 1}$ permits the expansion $$z_{m,q} = \underbrace{Q(q)^{-1}(I-X(q))}_{T(q)} s_{m,q} + \check{n}_{m,q}, \quad 1 \leq m \leq M, \qquad (12)$$

with $T(q) \in \mathbb{C}^{2 \times 2}$, $s_{m,q} = [s_m^{(1)}, s_{[m+q]}^{(2)}]^T$ and $\mathbb{E}[\check{n}_{m,q} \check{n}_{m,q}^\dagger] = I$. The two symbols in $s_{m,q}$ can now be jointly demodulated using the two-symbol max-log demodulator on $z_{m,q}$ for $1 \leq m \leq M$.

To determine the best q (or equivalently the best pair (m, [m+q])) we can use the capacity metric on the model in (12) and determine a suitable $\hat{q}$ as $$\arg \max_{0 \leq q \leq M-1} \det(I + T(q)^\dagger T(q)) = \arg \max_{0 \leq q \leq M-1} \det(X(q)^{-1}) \qquad (13)$$
$$= \arg \min_{0 \leq q \leq M-1} \det(X(q)).$$

Thus, we can equivalently first determine the vector $$r = F[h_1^{(1)\dagger} R_1^{-1} h_1^{(2)}, \ldots, h_M^{(1)\dagger} R_M^{-1} h_M^{(2)}]^T \qquad (14)$$

and compute $\hat{q}$ as $$\hat{q} = \arg \max_{1 \leq k \leq M} \{|r_k|\} - 1. \qquad (15)$$

1.4 New OFDMA Receiver with Improved Pairing

We only demodulate the symbols of a particular user of interest. Suppose for the m-th subcarrier (tone) the $n_R \times 1$ channel response vector of the UE is $h_m \in \mathbb{C}^{n_R}$ and the DFT-spread symbol is $x_m$. The received signal vector on the m-th tone is given by $$y_m = h_m x_m + n_m, \qquad (16)$$

where the noise vector $n_m$ satisfies $\mathbb{E}[n_m n_m^\dagger] = S_m$. We define $R_m = h_m h_m^\dagger + S_m$ for $1 \leq m \leq M$ and $s = [s_1, s_2, \ldots, s_M]^T$, where $\{s_m\}$ are QAM symbols normalized to have unit average energy and let $x = [x_1, x_2, \ldots, x_M]^T = Fs$, where F is the M×M DFT matrix.

We obtain $$\hat{x}_m = h_m^\dagger R_m^{-1} y_m, \quad m = 1, \ldots, M. \qquad (17)$$

Defining $\hat{x} = [\hat{x}_1, \ldots, \hat{x}_M]^T$ and applying the inverse DFT on $\hat{x}$, we obtain $$\hat{s} = [\hat{s}_1, \ldots, \hat{s}_M]^T \triangleq F^\dagger \hat{x}. \qquad (18)$$

Suppose we form the pair $\hat{s}_{m,q} = [\hat{s}_m, \hat{s}_{[m+q]}]^T$ for any given q: $1 \leq q \leq M-1$ and where $[m+q] = (m+q-1) \mod(M) + 1$. Please note that the pairing employed in OFDMA before always uses q=1. Then we determine the matrix X(q) such that $$I - X(q) = \frac{1}{M} \begin{bmatrix} \sum_{k=1}^{M} h_k^\dagger R_k^{-1} h_k & \sum_{k=1}^{M} h_k^\dagger R_k^{-1} h_k \exp(j2\pi q(k-1)/M) \\ \sum_{k=1}^{M} h_k^\dagger R_k^{-1} h_k^{(1)} \exp(j2\pi q(k-1)/M) & \sum_{k=1}^{M} h_k^\dagger R_k^{-1} h_k \end{bmatrix} \qquad (19)$$

Next, we compute the 2×2 matrix $Q(q) \in \mathbb{C}^{2 \times 2}$ using the Cholesky decomposition $$Q(q)Q(q)^\dagger = (I - X(q))X(q) \qquad (20)$$

and then determine $$z_{m,q} \triangleq Q(q)^{-1} \hat{s}_{m,q},$$

$1 \leq m \leq M$. $z_{m,q} \in \mathbb{C}^{2\times 1}$ permits the expansion $$z_{m,q} = \underbrace{Q(q)^{-1}(I - X(q))}_{T(q)} s_{m,q} + \check{n}_{m,q}, \quad (21)$$

with $T(q) \in \mathbb{C}^{2\times 2}$, $s_{m,q} = [s_m, s_{[m+q]}]^T$ and $\mathbb{E}[\check{n}_{m,q}\check{n}_{m,q}^\dagger] = I$. The two symbols in $s_{m,q}$ can now be jointly demodulated using the two-symbol max-log demodulator on $z_{m,q}$.

To determine the best q (or equivalently the best pair (m, [m+q])) we can use the capacity metric on the model in (21) and determine a suitable q as $$\arg\max_{1\leq q \leq M/2} \det(I + T(q)^\dagger T(q)) = \arg\max_{1\leq q \leq M/2} \det(X(q)^{-1}) \quad (22)$$

$$= \arg\min_{1\leq q \leq M/2} \det(X(q)).$$

Thus, we can equivalently first determine the (first M/2+1 rows of the) vector $$r = F[h_1^\dagger R_1^{-1} h_1, \ldots, h_M^\dagger R_M^{-1} h_M]^T \quad (23)$$

and compute $\hat{q}$ as $$\hat{q} = \arg\max_{2\leq k \leq M/2+1} \{|r_k|\} - 1. \quad (24)$$

Referring again to the diagram of FIG. 3, for the case of demodulating a single signal codeword, the input to the linear minimum mean square error equalizer LMMSE 100 is a signal vector of the form $y_m = h_m x_m + n_m$ (16). The output (17) from the equalizer 100, according to the form $\hat{x}_m = h_m^\dagger R_m^{-1} y_m$, $m = 1, \ldots, M$ (17), is them handled by the M-point inverse discrete Fourier Transform processing 102 to provide a transformed output of the form $$\hat{s} = [\hat{s}_1, \ldots, \hat{s}_M]^T \triangleq F^\dagger \hat{x}. \quad (18)$$

This output from the IDFT circuit is then handled by a pairing and whitening processing 104 which outputs either the IDFT output according to (18) or $$z_{m,q} = \underbrace{Q(q)^{-1}(I - X(q))}_{T(q)} s_{m,q} + \check{n}_{m,q} \text{ according to (21)}.$$

Based on the channel estimates and the data rate, the pairing and whitening module 104 can decide whether or not to process its input signal. In case the pairing and whitening module decides not to process its input signal, then the input to the calculator 106 is of the form (18) and SISO LLR calculator is used in 106. In case the pairing and whitening module 104 decides to process its input signal, then the output of the pairing and whitening module consists of length-2 vectors of the form (21) and the Two-symbol MLSD function in the calculator 106 is used. An illustrative pairing and whitening procedure is given by the following relationships $$r = F[h_1^\dagger R_1^{-1} h_1, \ldots, h_M^\dagger R_M^{-1} h_M]^T \quad (23)$$

$$\text{and } \hat{q} = \arg\max_{2\leq k \leq M/2+1} \{|r_k|\} - 1., \quad (24)$$

described in detail above.

Referring again to the diagram of FIG. 4, for the case of demodulating multiple signal codewords, the input to the LMMSE equalizers 200 (202) is a signal vector of the form $y_m = H_m x_m + n_m$ (1). The output of the LMMSE equalizers 200 (202) and input to inverse discrete Fourier transformers IDFT 204 (206) is of the form $$\begin{bmatrix} \hat{x}_m^{(1)} \\ \hat{x}_m^{(2)} \end{bmatrix} = H_m^\dagger (I + H_m H_m^\dagger)^{-1} y_m = (I + H_m^\dagger H_m)^{-1} H_m^\dagger y_m, \quad (3)$$

$$m = 1, \ldots, M.$$

The output of inverse DFTs 204 (206) and input to the pairing and whitening module 208 is of the form $$\hat{s}^{(k)} \triangleq F^\dagger \hat{x}^{(k)}. \quad (4)$$

The output of the pairing and whitening module 208 is either of the form in (4) or in (12).

Based on the channel estimates and the data rate, the pairing and whitening module 208 can decide whether or not to process its input signal. In case it decides not to process its input signal, then the input to the calculator 210 is of the form (4) and SISO LLR calculator is used in 210. In case module 208 decides to process its input, the output of module 208 is produced using a pairing and whitening procedure and consists of length-2 vectors of the form in (12). An illustrative pairing and whitening procedure is given by $$r = F[h_1^{(1)\dagger} R_1^{-1} h_1^{(2)}, \ldots, h_M^{(1)\dagger} R_M^{-1} h_M^{(2)}]^T \quad (14)$$

$$\text{and } \hat{q} = \arg\max_{1\leq k \leq M} \{|r_k|\} - 1, \quad (15)$$

which is described in detail above.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A receiver for discrete Fourier transform-spread-orthogonal frequency division multiplexing (DFT-S-OFDM) based systems, comprising:
   a prefilter for demodulating one of a received signal codeword and received signal codewords; and
   a log-likelihood ratio LLR module responsive to the prefilter,
   wherein the prefilter includes a pairing and whitening module that, based on channel estimates and a data rate, enables the LLR module to perform either a Serial-In- Serial-Out (SISO) based log likelihood ratio processing of an output from the pairing and whitening module or a two-symbol max-log soft output demodulator (two-symbol MLSD) based log likelihood ratio processing of the output from the pairing and whitening module, the pairing and whitening module electing not to process an input received from an inverse discrete Fourier transform (IDFT) module when the LLR module is enabled to perform the SISO based log likelihood ratio processing.

2. The receiver of claim 1, wherein the pairing and whitening module provides an output of the form $$\hat{s} = [\hat{s}_1, \ldots, \hat{s}_M]^T \triangleq F^\dagger \hat{x},$$

where $\hat{x}$ is a per-tone equalized received signal vector in the frequency domain and $F^\dagger$ performs an inverse discrete Fourier transform (IDFT) operation on an M×M matrix.

3. The receiver of claim 1, wherein for received signal codewords the pairing and whitening module provides an output of the form $$\hat{s}^{(k)} \triangleq F^\dagger \hat{x}^{(k)},$$

where $\hat{x}^{(k)}$ is a per-tone equalized received signal vector in the frequency domain corresponding to the $k^{th}$ codeword and $F^\dagger$ performs an inverse discrete fourier transform (IDFT) operation.

4. The receiver of claim 1, wherein for received signal codewords the pairing procedure is consistent with the following signal relationships $$r = F[h_1^{(1)\dagger} R_1^{-1} h_1^{(2)}, \ldots, h_M^{(1)\dagger} R_M^{-1} h_M^{(2)}]^T$$

and compute $\hat{q}$ as $$\hat{q} = \arg\max_{1 \leq k \leq M} \{|r_k|\} - 1,$$

where $h_m^{(1)}$, $h_m^{(2)}$ denote the frequency domain channel response vectors on an $m^{th}$ tone corresponding to codeword 1 and codeword 2, respectively, and $R_m$ denotes a covariance matrix for the $m^{th}$ tone and F denotes a discrete Fourier transform matrix, $\hat{q}$ being determined by subtracting one from an index of a maximum magnitude element of the vector r, an $m^{th}$ symbol of codeword 1 being paired with an $(m+\hat{q})^{th}$ symbol of codeword 2 subject to a modulo operation.

5. A receiver for discrete Fourier transform-spread-orthogonal frequency division multiplexing (DFT-S-OFDM) based systems, comprising:
a prefilter for demodulating one of a received signal codeword and received signal codewords; and
a log-likelihood ratio LLR module responsive to the prefilter,
wherein the prefilter includes a pairing and whitening module that, based on channel estimates and a data rate, enables the LLR module to perform either a Serial-In-Serial-Out (SISO) based log likelihood ratio processing of an output from the pairing and whitening module or a two-symbol max-log soft output demodulator (two-symbol MLSD) based log likelihood ratio processing of the output from the pairing and whitening module, the pairing and whitening module electing to process an input received from an inverse discrete Fourier transform (IDFT) module when the LLR module is enabled to perform the two-symbol MLSD based log likelihood ratio processing.

6. The receiver of claim 5, wherein the pairing and whitening module divides the symbols of a same codeword into multiple pairs and obtains a decision vector and an effective channel matrix for each pair.

7. The receiver of claim 5, wherein the pairing and whitening module divides the symbols of two different codewords into multiple pairs and obtains a decision vector and an effective channel matrix for each pair.

8. The receivers of claim 6, wherein LLRs corresponding to coded bits in each symbol pair are computed by the two-symbol MLSD responsive to the decision vector and the effective channel matrix of that pair.

9. The receiver of claim 6, wherein the pairing and whitening module provides an output consisting of length-2 decision vectors $\{z_m\}$ that are expanded as $z_m = T_m s_m + \check{n}_m$, where $s_m$ denotes the vector consisting of the $m^{th}$ pair of symbols from the same codeword and $T_m$ denotes the effective channel matrix for the $m^{th}$ pair obtained after pairing and noise whitening with $\check{n}_m$ being the whitened noise vector having two uncorrelated elements.

10. The receiver of claim 7, wherein for multiple received signal codewords, the pairing and whitening module provides an output consisting of length-2 decision vectors $\{z_m\}$ that are expanded as $z_m = T_m s_m + \check{n}_m$, where $s_m$ denotes the vector consisting of the $m^{th}$ pair of symbols from two different codewords and $T_m$ denotes the effective channel matrix for the $m^{th}$ pair obtained after pairing and noise whitening with $\check{n}_m$ being the whitened noise vector having two uncorrelated elements.

11. The receiver of claim 9, wherein the pairing and whitening module provides an output consisting of length-2 decision vectors $\{z_m\}$ that are expanded as $z_m = T s_m + \check{n}_m$, where $s_m$ denotes the vector consisting of the $m^{th}$ pair of symbols from the same codeword and T denotes the effective channel matrix which is identical for all pairs with $\check{n}_m$ being the whitened noise vector having two uncorrelated elements.

12. The receiver of claim 10, wherein the pairing and whitening module provides an output consisting of length-2 decision vectors $\{z_m\}$ that are expanded as $z_m = T s_m + \check{n}_m$, where $s_m$ denotes the vector consisting of the $m^{th}$ pair of symbols from two different codewords and T denotes the effective channel matrix which is identical for all pairs with $\check{n}_m$ being the whitened noise vector having two uncorrelated elements.

13. The receiver of claim 5, wherein a pairing procedure is consistent with the following signal relationships $$r = F[h_1^\dagger R_1^{-1} h_1, \ldots, h_M^\dagger R_M^{-1} h_M]^T$$

and compute $\hat{q}$ as $$\hat{q} = \arg\max_{2 \leq k \leq M/2+1} \{|r_k|\} - 1,$$

where $h_m$ denotes the frequency domain channel response vector on an $m^{th}$ tone, $R_m$ denotes a covariance matrix for the $m^{th}$ tone and F denotes a discrete Fourier transform matrix, $\hat{q}$ being determined by subtracting 1 from the index of the element of the vector r that among all the elements of the vector r with indices in $\{2, \ldots, M/2+1\}$ has the maximum magnitude, and an $m^{th}$ symbol of the codeword being then paired with an $(m+\hat{q})^{th}$ symbol of a same codeword.

14. A receiver for discrete Fourier transform-spread-orthogonal frequency division multiplexing (DFT-S-OFDM) based systems, comprising:
- a prefilter for demodulating one of a received signal codeword and received signal codewords; and
- a log-likelihood ratio LLR module responsive to the prefilter,
- wherein the prefilter includes a pairing and whitening module that, based on channel estimates and a data rate, enables the LLR module to perform either a Serial-In-Serial-Out (SISO) based log likelihood ratio processing of an output from the pairing and whitening module or a two-symbol max-log soft output demodulator (two-symbol MLSD) based log likelihood ratio processing of the output from the pairing and whitening module, the prefilter including a per-tone equalizer for one of the received signal codeword and received signal codewords and an inverse discrete Fourier transform IDFT module responsive to the equalizer, the pairing and whitening module being responsive to the IDFT module.

* * * * *